Patented July 30, 1946

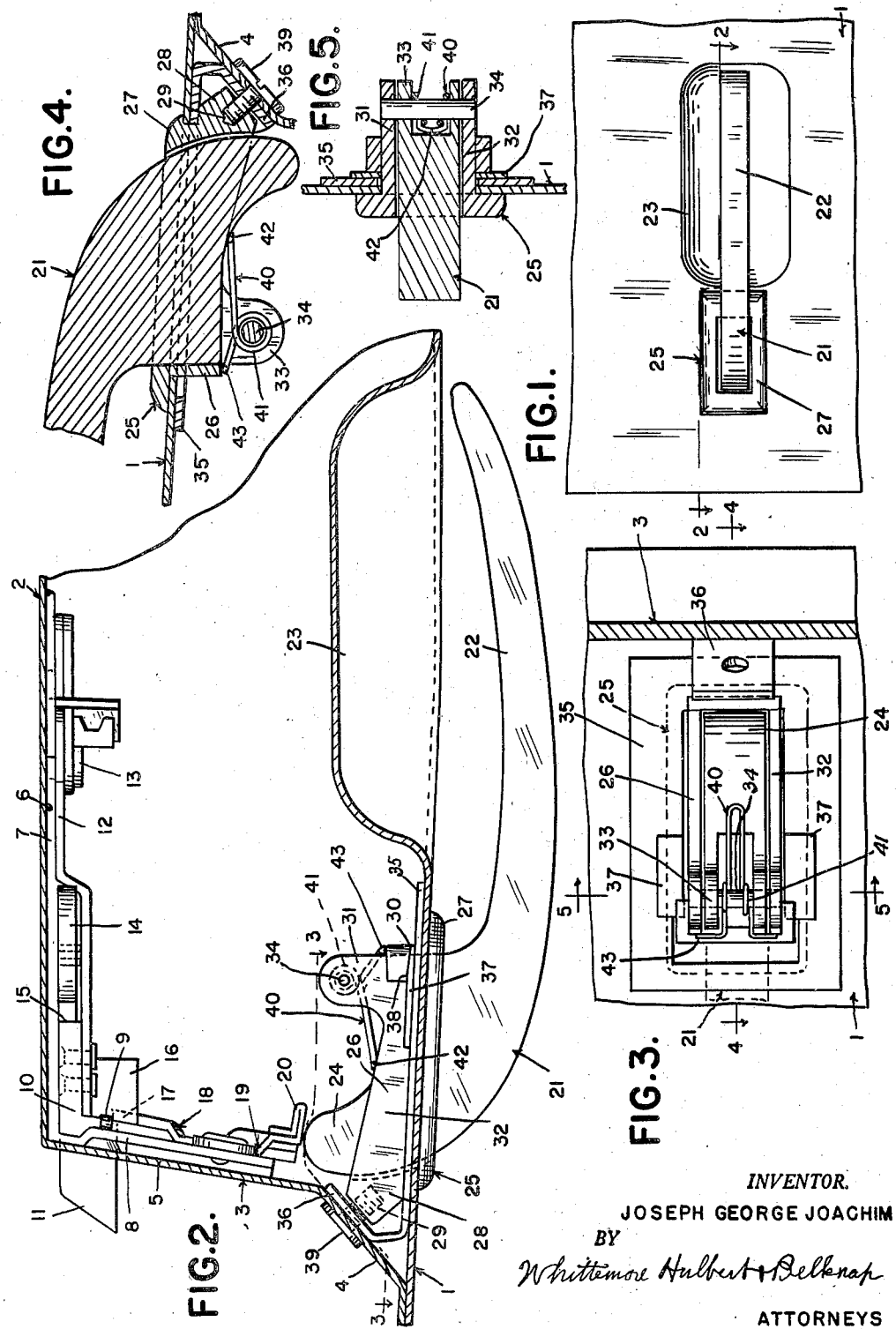

2,404,845

UNITED STATES PATENT OFFICE 2,404,845

LATCH HANDLE ASSEMBLY

Joseph George Joachim, Detroit, Mich., assignor to Ferro Stamping & Manufacturing Company, Detroit, Mich., a corporation of Michigan Original application April 26, 1943, Serial No. 484,610, now Patent No. 2,382,062, dated August 14, 1945. Divided and this application March 7, 1944, Serial No. 525,406

1 Claim. (Cl. 292—348)

The invention relates to latch handle assemblies, especially for automobile doors, and refers more particularly to mountings for latch handles.

The invention has for one of its objects to provide an improved latch handle assembly which is so constructed that it may be readily mounted and secured in place on a door.

The invention has for another object to provide a latch handle assembly having a handle of the pull-out type which is free from positive connection with the latch so that the handle when released in an operating position may be returned to its normal position independently of the latch.

With these as well as other objects in view, the invention resides in the novel features of construction and combinations and arrangements of parts as more fully hereinafter set forth.

In the drawing:

Figure 1 is an outside elevation of a portion of an automobile having applied thereto a latch and latch handle assembly embodying the invention;

Figure 2 is a cross section on the line 2—2 of Figure 1;

Figure 3 is a cross section on the line 3—3 of Figure 2;

Figures 4 and 5 are cross sections on the lines 4—4 and 5—5, respectively, of Figure 3.

As illustrated in the drawing, the automobile door has the laterally spaced outside and inside panels 1 and 2, respectively, and the pillar 3 extending between the panels at the swinging edge of the door and having the portion 4 connecting into the outside panel at an acute angle and the portion 5 connecting into the inside panel at an obtuse angle.

The latch generally comprises the latch plate 6 which is formed with the base 7 and the transverse flange 8, the base and flange being respectively secured to the inside panel 2 and the portion 5 of the pillar 3 by suitable means such as the screws 9. 10 is the latch bolt slidably mounted on the base 7, it having the nose 11 slidably extending through openings in the flange 8 and pillar portion 5 and a longitudinally extending slotted portion 12 through the slot of which extends the rivet 13. The bolt is normally held in its extended or latching position by means of the spring 14 which is secured to the base 7 and engages a transverse shoulder 15 on the bolt. The bolt is adapted to be moved to released position by suitable means, including a roll-back pivotally mounted on the base 7 and having a transverse lug 16 which is engageable by the projection 17 on the dog 18, which latter extends transversely of the roll-back and is pivotally mounted upon the transverse flange 8. The dog is pivotally connected to the lower end of the lever 19, the upper end of which is freely or loosely pivotally connected to the transverse flange 8. The lever 19 is provided with the transverse abutment 20 intermediate its ends. The construction of latch is more fully described in my copending application Serial No. 484,610, filed April 26, 1943, now Patent No. 2,382,062, issued on August 14, 1945, of which this application is a division.

The latch handle assembly has the handle 21 which is of the pull-out type and is formed of suitable material, such as metal or reinforced plastic, the handle, as shown, being formed of cast zinc. The handle has the grip portion 22 located generally in front of and closely adjacent to the outside panel 1 which is preferably formed with the pocket 23 to facilitate grasping the grip portion. It is apparent that if it is desired to produce a stream-line effect, the outside panel may be formed with a pocket to completely receive the handle. The handle has the rounded nose 24 for rolling engagement with the abutment 20 of the lever 19 upon swinging of the handle transversely of the outside panel. The handle is mounted directly on the escutcheon 25 which has the hollow body 26 extending through the outside panel 1 and the integral transverse peripheral flange 27 at the outside edge of the body and overlying and abutting the outside panel at its outer side. The body has its end wall 28 nearest the pillar 3 formed with the tapped hole 29 and has its opposite end wall 30 forming a stop for abutting the handle when in its normal retracted position. The body also has the lugs 31 extending from the inside edges of its side walls 32 adjacent the end wall 30 for pivotally mounting the handle on the escutcheon. As shown, the handle has the lugs 33 located between the lugs 31 and journaled on the pin 34 which extends through both pairs of lugs. 35 is a reinforcement plate fixedly secured to the outside panel 1 at its inner side as by being welded thereto, this plate being formed with an opening for receiving the escutcheon body 26. The plate is also provided with the angling ear 36 which is preferably return-bent and extends at an angle corresponding to that made by the adjacent portion 4 of the pillar 3. The reinforcement plate is further provided at opposite sides of the escutcheon body with the wedges 37 which are adapted to be engaged by the shoulders 38 extending laterally from the side walls 32 of the escutcheon body. 39 is a screw extending through the pillar portion 4 and the ear 36 and into the tapped hole 29 in the adjacent end wall 28 of the escutcheon body, the axis of the tapped hole being inclined to the length of the body and at right angles to the pillar portion and ear. The construction is such that when the screw is tightened up it moves the escutcheon longitudinally relative to the outside panel toward the pillar and also moves the portion of the escutcheon adjacent the pillar transversely of the front panel and in an inward direction. Furthermore, the longitudinal movement of the escutcheon causes the shoulders 38 to ride up on the wedges 37. As a result, the peripheral flange 27 of the escutcheon is tightly clamped against the outside of the outside panel. To return the handle to its normal retracted position, I have provided the spring 40 which has intermedaite portions 41 coiled around the pin 34, a looped end portion 42 engaging the handle, and transverse end portions 43 abutting the end wall 30 of the escutcheon body.

In operation, upon pulling the grip portion 22 of the handle 21 outwardly from the normal position of the handle, as shown in Figure 2 particularly, the nose 24 of the handle through the abutment 20 swings the lever 19 which in turn swings the actuating dog 18 to actuate the rollback of the latch in a direction to slide the latch bolt 10 to retracted position. Upon release of the handle, it will be returned to its normal position independently of the latch by the spring 40.

From the above description, it will be seen that I have provided a simple construction of latch handle assembly which may be readily mounted in operative relation to a latch. It will also be seen that the mounting comprises but few parts which are so arranged that the mounting may be tightly secured in place.

The above application is a division of my copending application Serial No. 484,610, filed April 26, 1943, now Patent No. 2,382,062, issued on August 14, 1945.

What I claim as my invention is:

In a latch for a door having an outside panel and a pillar, an escutcheon having a hollow body extending through the panel and formed with side and end walls, said escutcheon also having a transverse peripheral flange integral with said body and overlying the panel at the outer side thereof, a reinforcement plate secured to the panel at the inner side thereof, means engaging the pillar and adjacent end wall of said body and extending at an angle to the panel for moving said escutcheon longitudinally of the panel and also transversely inwardly of the panel, cooperating wedging means on said reinforcement plate and said body near the opposite end wall thereof for moving said escutcheon transversely inwardly of the panel upon movement of said first mentioned means, and a handle for actuating the latch having a portion extending through said escutcheon and pivotally connected to said body.

JOSEPH GEORGE JOACHIM.